(12) United States Patent
Kim et al.

(10) Patent No.: US 10,178,651 B2
(45) Date of Patent: Jan. 8, 2019

(54) METHOD AND SYSTEM FOR UPLINK HARQ AND CSI MULTIPLEXING FOR CARRIER AGGREGATION

(71) Applicant: BlackBerry Limited, Waterloo (CA)

(72) Inventors: Joon Beom Kim, Carrollton, TX (US); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 38 days.

(21) Appl. No.: 13/787,479

(22) Filed: Mar. 6, 2013

(65) Prior Publication Data

US 2013/0301550 A1 Nov. 14, 2013

Related U.S. Application Data

(60) Provisional application No. 61/646,072, filed on May 11, 2012.

(51) Int. Cl.
*H04W 72/02* (2009.01)
*H04L 1/00* (2006.01)
(Continued)

(52) U.S. Cl.
CPC ........... *H04W 72/02* (2013.01); *H04L 1/0026* (2013.01); *H04L 1/0029* (2013.01); *H04L 1/0031* (2013.01); *H04L 1/0069* (2013.01); *H04L 1/0071* (2013.01); *H04L 1/0073* (2013.01); *H04L 1/0079* (2013.01); *H04L 1/1671* (2013.01); *H04L 1/1861* (2013.01); *H04W 28/06* (2013.01)

(58) Field of Classification Search
CPC ........ H04W 72/02; H04W 28/06; H04L 5/00; H04L 1/00
See application file for complete search history.

(56) References Cited

U.S. PATENT DOCUMENTS 5,127,013 A 6/1992 Yoshida
6,122,324 A 9/2000 Burchett, Jr.
(Continued)

FOREIGN PATENT DOCUMENTS

CN 1189935 A 8/1998
CN 101449463 A 6/2009
(Continued)

OTHER PUBLICATIONS

Buckley, Michael Eoin, et al.; U.S. Appl. No. 14/266,344, filed April 30, 2014; Title: Message Rearrangement for Improved Wireless Code Performance.
(Continued)

*Primary Examiner* — Walter J Divito
*Assistant Examiner* — Anthony Luo
(74) *Attorney, Agent, or Firm* — Conley Rose, P.C.; J. Robert Brown, Jr.

(57) ABSTRACT

A method and apparatus for operating a user equipment (UE) in a wireless communications network, the method separately encoding and rate matching a first set of information bits and a second set of information bits; mapping and concatenating the encoded and rate matched first set of information bits with the encoded and rate matched second set of information bits, thereby creating a bit stream; and modulating and transmitting the bit stream.

25 Claims, 8 Drawing Sheets

(51) Int. Cl.
*H04L 1/16* (2006.01)
*H04L 1/18* (2006.01)
*H04W 28/06* (2009.01)

(56) References Cited

U.S. PATENT DOCUMENTS

| | | | |
|---|---|---|---|
| 6,445,476 | B1 | 9/2002 | Kahn et al. |
| 7,254,769 | B2 | 8/2007 | Kim et al. |
| 8,345,794 | B2 | 1/2013 | Xu et al. |
| 2002/0141433 | A1 | 10/2002 | Kwon et al. |
| 2003/0039217 | A1 | 2/2003 | Seo et al. |
| 2003/0108013 | A1 | 6/2003 | Hwang et al. |
| 2003/0133497 | A1 | 7/2003 | Kinjo et al. |
| 2003/0236071 | A1* | 12/2003 | Ito .................................. 455/59 |
| 2004/0010743 | A1 | 1/2004 | Lee et al. |
| 2004/0268206 | A1 | 12/2004 | Kim et al. |
| 2005/0147159 | A1 | 7/2005 | Kadowaki |
| 2006/0015789 | A1 | 1/2006 | Shin et al. |
| 2006/0039409 | A1 | 2/2006 | Lampinen |
| 2006/0156184 | A1 | 7/2006 | Kim et al. |
| 2007/0047499 | A1 | 3/2007 | Montojo et al. |
| 2007/0071119 | A1* | 3/2007 | Davydov .............. H04L 1/0041 375/260 |
| 2007/0286103 | A1 | 12/2007 | Niu et al. |
| 2008/0146166 | A1 | 6/2008 | Khan et al. |
| 2008/0153425 | A1 | 6/2008 | Heo et al. |
| 2008/0165893 | A1 | 7/2008 | Malladi et al. |
| 2008/0310360 | A1 | 12/2008 | Heo et al. |
| 2008/0320373 | A1 | 12/2008 | Kim et al. |
| 2009/0154458 | A1* | 6/2009 | Kim et al. .................... 370/390 |
| 2009/0175248 | A1 | 7/2009 | Kim et al. |
| 2009/0296667 | A1 | 12/2009 | Tajima et al. |
| 2009/0310589 | A1* | 12/2009 | Nangia ................. H04L 5/0007 370/344 |
| 2010/0046482 | A1 | 2/2010 | Sridhara et al. |
| 2010/0098012 | A1 | 4/2010 | Bala et al. |
| 2010/0135181 | A1 | 6/2010 | Earnshaw et al. |
| 2010/0157895 | A1* | 6/2010 | Pani et al. .................... 370/328 |
| 2010/0172433 | A1* | 7/2010 | Li et al. .......................... 375/295 |
| 2010/0195662 | A1* | 8/2010 | Kang et al. .................... 370/412 |
| 2010/0246604 | A1* | 9/2010 | Kim et al. .................... 370/474 |
| 2010/0251061 | A1* | 9/2010 | Okamura et al. ............. 714/752 |
| 2010/0284362 | A1 | 11/2010 | Tajima et al. |
| 2011/0010598 | A1 | 1/2011 | Wang et al. |
| 2011/0142000 | A1* | 6/2011 | Han ....................... H04L 5/0053 370/329 |
| 2011/0149894 | A1 | 6/2011 | Luo et al. |
| 2011/0182277 | A1 | 7/2011 | Shapira |
| 2011/0205981 | A1 | 8/2011 | Koo et al. |
| 2011/0249578 | A1 | 10/2011 | Nayeb Nazar et al. |
| 2011/0268045 | A1 | 11/2011 | Heo et al. |
| 2011/0269490 | A1 | 11/2011 | Earnshaw et al. |
| 2011/0274059 | A1 | 11/2011 | Brown et al. |
| 2011/0274062 | A1* | 11/2011 | Cheng .................... H03M 13/13 370/329 |
| 2011/0286544 | A1* | 11/2011 | Avudainayagam et al. ................. 375/295 |
| 2012/0020434 | A1* | 1/2012 | Callard et al. ................. 375/296 |
| 2012/0033587 | A1* | 2/2012 | Papasakellariou ...... H04J 13/00 370/277 |
| 2012/0082075 | A1 | 4/2012 | Luo et al. |
| 2012/0087437 | A1 | 4/2012 | Fong |
| 2012/0099545 | A1* | 4/2012 | Han et al. ...................... 370/329 |
| 2012/0113831 | A1 | 5/2012 | Pelletier et al. |
| 2012/0134446 | A1* | 5/2012 | Zhou .................... H03M 13/655 375/320 |
| 2012/0210187 | A1 | 8/2012 | Yin et al. |
| 2012/0230268 | A1* | 9/2012 | Marinier ............ H04W 72/0453 370/329 |
| 2012/0257582 | A1* | 10/2012 | Damnjanovic ......... H04L 5/001 370/329 |
| 2013/0116002 | A1 | 5/2013 | Kim et al. |
| 2013/0117622 | A1* | 5/2013 | Blankenship ....... H03M 13/136 714/751 |

FOREIGN PATENT DOCUMENTS

| | | |
|---|---|---|
| CN | 101695017 A | 4/2010 |
| CN | 101902313 A | 12/2010 |
| CN | 102017495 A | 4/2011 |
| CN | 102414997 A | 4/2012 |
| EP | 1098445 A1 | 5/2001 |
| EP | 1811711 A1 | 7/2007 |
| EP | 1850521 A2 | 10/2007 |
| EP | 1895666 A1 | 3/2008 |
| EP | 2579532 A2 | 4/2013 |
| WO | 1997040582 A1 | 10/1997 |
| WO | 2001041314 A1 | 6/2001 |
| WO | 2009134913 A1 | 11/2009 |
| WO | 2011019795 A1 | 2/2011 |
| WO | 2011152659 A2 | 12/2011 |
| WO | 2011152659 A3 | 12/2011 |
| WO | 2012044846 A1 | 4/2012 |

OTHER PUBLICATIONS

Blakenship, Yufei Wu, et al.; U.S. Appl. No. 13/649,911, filed Oct. 11, 2012; Title: Method and System for Up-Link HARQ-ACK and CSI Transmission.
3GPP TR 25.814 V7.0.0; 3rd Generation Partnership Project; Technical Specification Group Radio Access Network; Physical Layer Aspects for Evolved Universal Terrestrial Radio Access (UTRA); Release 7; Jun. 2006; 126 pages.
3GPP TS 36.212 V9.0.0; 3rd Generation Partnership Project; Technical Specification Group Radio Access Network; Evolved Universal Terrestrial Radio Access (E-UTRA); Multiplexing and Channel Coding; Release 9; Dec. 2009; 61 pages.
3GPP TS 36.213 V10.2.0; 3rd Generation Partnership Project; Technical Specification Group Radio Access Network; Evolved Universal Terrestrial Radio Access (E-UTRA); Physical Layer Procedures; Release 10; Jun. 2011; 120 pages.
3GPP TSG RAN WG1 Meeting #61; "A/N Codebook Design with DTX for Carrier Aggregation"; R1-103088; Montreal, Canada; May 10-14, 2010; 11 pages.
3GPP TSG-RAN WG1 #60bis; "On ACK/NACK Codebook Performance for Carrier Aggregation"; R1-101787; Beijing, China; Apr. 12-16, 2010; 19 pages.
3GPP TSG RAN WG1 Meeting #62; "Equalization of ACK/NAK Bit Performance in LTE-A"; R1-104314; Madrid, Spain; Aug. 23-27, 2010; 3 pages.
Office Action dated Sep. 26, 2013; U.S. Appl. No. 13/268,255, filed Oct. 7, 2011; 19 pages.
Notice of Allowance dated Mar. 6, 2014; U.S. Appl. No. 13/268,255, filed Oct. 7, 2011; 16 pages.
Office Action dated Aug. 1, 2013; U.S. Appl. No. 13/649,911, filed Oct. 11, 2012; 25 pages.
Office Action dated Jan. 13, 2014; U.S. Appl. No. 13/649,911, filed Oct. 11, 2012; 14 pages.
Final Office Action dated May 8, 2014; U.S. Appl. No. 13/649,911, filed Oct. 11, 2012; 22 pages.
PCT International Search Report; Application No. PCT/US2012/059979; dated Feb. 8, 2013; 4 pages.
PCT Written Opinion of the International Searching Authority; Application No. PCT/US2012/059979; dated Feb. 8, 2013; 6 pages.
PCT International Search Report; Application No. PCT/US2010/052075; dated Jan. 19, 2011; 4 pages.
PCT Written Opinion of the International Searching Authority; Application No. PCT/US2010/052075; dated Jan. 19, 2011; 7 pages.
European Extended Search Report; Application No. 11184419.7; dated Nov. 30, 2011; 5 pages.
PCT International Search Report; Application No. PCT/US2013/029416; dated May 7, 2013; 12 pages.
R1-113218, 3GPP TSG-RAN WG1 Meeting #66bis, "Multiplexing CSI and A/N using PUCCH F3", InterDigital Communications, LLC, Oct. 10-14, 2011, Zhuhai, China, 10 pages.

(56) References Cited

OTHER PUBLICATIONS

R1-112921, 3GPP TSG-RAN WG1 #66. "Periodic CSI and A/N reporting for CA", Ericsson/ST-Ericsson, Oct. 10-14, 2011, Zhuhai, China, 4 pages.
D. Divsalar, H. Jin, and R. J. McEliece. "Coding theorems for 'turbo-like' codes." Proc. 36th Allerton Conf. on Communication, Control and Computing, Allerton, Illinois, Sep. 1998, pp. 201-210.
3GPP TS36.211 V10.1.0 3rd Generation Partnership Project; Technical Specification Group Radio Access Network; Evolved Universal Terrestrial Radio Access (E-UTRA); Physical Channels and Modulation (Release 10) (Mar. 2011); 104 pages.
3GPP TS36.212: V10.1.0 3rd Generation Partnership Project; Technical Specification Group Radio Access Network; Evolved Universal Terrestrial Radio Access (E-UTRA); Multiplexing and channel coding, (Release 10); 77 pages.
3GPP TS36.213 V10.1.0 3rd Generation Partnership Project; Technical Specification Group Radio Access Network; Evolved Universal Terrestrial Radio Access (E-UTRA); Physical layer procedures (Release 10) (Mar. 2011); 115 pages.
Office Action dated Oct. 10, 2014; U.S. Appl. No. 14/266,344, filed Apr. 30, 2014; 15 pages.
Office Action dated Aug. 28, 2014; U.S. Appl. No. 13/649,911, filed Oct. 11, 2012; 27 pages.
Notice of Allowance dated Dec. 23, 2014; U.S. Appl. No. 14/266,344, filed Apr. 30, 2014; 8 pages.
Notice of Allowance dated Jan. 14, 2015; U.S. Appl. No. 13/649,911, filed Oct. 11, 2012; 13 pages.
Korean Office Action as Received in Co-pending Application No. 10-2014-7015164 dated Feb. 18, 2016; 5 pages. (No English translation available.
Chinese Office Action; Application No. 201080070605.8; dated Jul. 3, 2015; 13 pages.
European Partial Search Report; Application No. 13788548.9; dated May 13, 2015; 7 pages.
Canadian Office Action; Application No. 2,814,069; dated Mar. 11, 2015; 3 pages.
European Extended Search Report; Application No. 13788548.9; dated Sep. 23, 2015; 11 pages.
Chinese Office Action as Received in Co-pending Application No. 201080070605.8 dated Mar. 28, 2016; 3 pages. (No English translation available).
Chinese Office Action as Received in Co-pending Application No. 2010800706058 dated Oct. 27, 2016; 5 pages. (No English translation available).
Chinese Office Action as Received in Co-pending Application No. 2013800247402 dated Feb. 3, 2017; 13 pages. (No English translation available).
Chinese Office Action; Application No. 201380024740.2; dated Feb. 3, 2017; 27 pages.
Chinese Office Action; Application No. 201380024740.2; dated Jul. 28, 2017; 20 pages.
Chinese Office Action; Application No. 201280065955.4; dated Jun. 19, 2017; 13 pages.
Canadian Office Action; Application No. 2,848,517; dated Aug. 25, 2015; 4 pages.
Canadian Office Action; Application No. 2,848,517; dated Jul. 21, 2016; 4 pages.
Chinese Office Action; Application No. 201280065955.4; dated Nov. 1, 2016; 13 pages.
Chinese Office Action; Application No. 201280065955.4; dated Oct. 30, 2017; 8 pages.
European Extended Search Report; Application No. 12846366.8; dated Apr. 8, 2015; 9 pages.
Chinese Office Action; Application No. 201380024740.2; dated Aug. 2, 2018; 7 pages.

\* cited by examiner

METHOD AND SYSTEM FOR UPLINK HARQ AND CSI MULTIPLEXING FOR CARRIER AGGREGATION

FIELD OF THE DISCLOSURE

The present disclosure relates to uplink transmissions in a wireless network and in particular relates to uplink transmissions utilizing carrier aggregation.

BACKGROUND

Data enabled mobile devices, such as smartphones, have become widely adopted, and applications and data requirements for such data enabled mobile devices have increased. As multimedia and data rich applications have become more prevalent, increased data throughput to and from a data enabled mobile device is needed. In response, newer wireless networks contemplate data throughput rates. For example, in a Long Term Evolution-Advanced (LTE-A) system, peak target data rates are 1 Gbps and 500 Mbps for downlink and uplink respectively. To achieve such target data rates, one potential approach is to use carrier aggregation techniques that utilize bandwidth aggregation of a variety of different arrangements of component carriers (CCs), including the same or different bandwidths, adjacent or non-adjacent CCs in the same frequency band or different frequency bands.

For efficient carrier aggregation, signalling overhead should be minimized. For example, in current long term evolution (LTE) systems, a user equipment (UE) may be configured to transmit hybrid automatic repeat request (HARQ) acknowledgements (ACK) on a physical uplink control channel (PUCCH) format 3.

However, the channel state information (CSI) is also transmitted on a PUCCH format 3 and the periodic CSI may be dropped if HARQ and the periodic CSI happen to be transmitted in the same subframe. The repeated dropping of the CSI may lead to a degradation of downlink throughput since the evolved Node B (eNB) scheduler cannot receive correct CSI reporting from a UE and may not be able to choose a suitable modulation and coding scheme for the transmission. Further, eNB may receive more HARQ-negative acknowledgement (NACK) feedbacks due to the CSI dropping.

BRIEF DESCRIPTION OF THE DRAWINGS

The present disclosure will be better understood with reference to the drawings, in which.

DETAILED DESCRIPTION OF THE DRAWINGS

Figure 1:
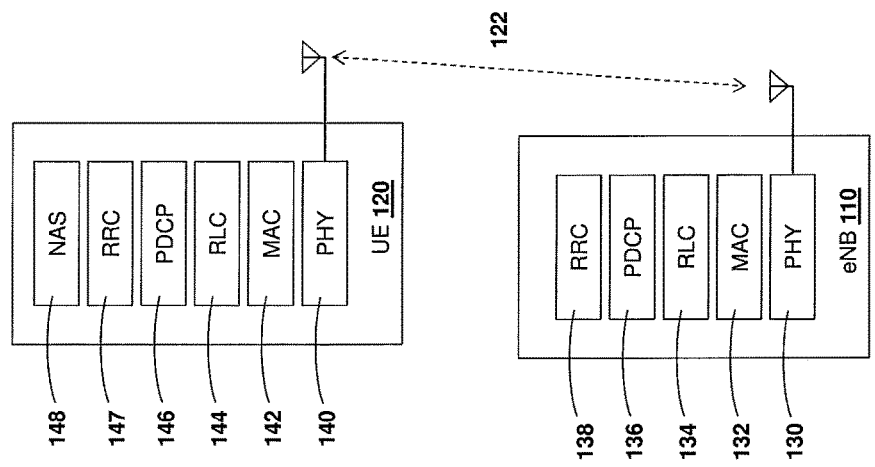
FIG. 1 is a schematic diagram showing an example protocol stack in a wireless communication system.

The present disclosure provides a method of operating a user equipment (UE) in a wireless communications network, the method comprising: separately encoding and rate matching a first set of information bits and a second set of information bits; mapping and concatenating the encoded and rate matched first set of information bits with the encoded and rate matched second set of information bits, thereby creating a bit stream; and modulating and transmitting the bit stream.

The present disclosure further provides a user equipment comprising: a processor; and a communications subsystem, wherein the processor and communications subsystem are configured to: separately encode and rate match a first set of information bits and a second set of information bits; map and concatenate the encoded and rate matched first set of information bits with the encoded and rate matched second set of information bits, thereby creating a bit stream; and modulate and transmit the bit stream.

The present disclosure further provides a method of operating a user equipment (UE) in a wireless communications network, the method comprising: separately encoding and rate matching a first set of information bits and a second set of information bits; concatenating the encoded and rate matched first set of information bits with the encoded and rate matched second set of information bits, thereby creating a bit stream; modulating the bit stream using a modulation scheme selected depending on a number of configured component carriers; and transmitting the modulated bit stream.

The present disclosure further provides a user equipment comprising: a processor; and a communications subsystem, wherein the processor and communications subsystem are configured to: separately encode and rate match a first set of information bits and a second set of information bits; concatenate the encoded and rate matched first set of information bits with the encoded and rate matched second set of information bits, thereby creating a bit stream; modulate the bit stream using a modulation scheme selected depending on a number of configured component carriers; and transmit the modulated bit stream.

The present disclosure further provides a method of operating a user equipment (UE) in a wireless communications network, the method comprising: separately encoding and rate matching a first set of information bits and a second set of information bits; concatenating and repeating the encoded and rate matched first set of information bits with the encoded and rate matched second set of information bits, thereby creating a bit stream; and modulating and transmitting the bit stream.

The present disclosure further provides a user equipment comprising: a processor; and a communications subsystem, wherein the processor and communications subsystem are configured to: separately encode and rate match a first set of information bits and a second set of information bits; concatenate and repeat the encoded and rate matched first set of information bits with the encoded and rate matched second set of information bits, thereby creating a bit stream; and modulate and transmit the bit stream.

The present disclosure further provides a method of operating a user equipment (UE) in a wireless communications network, the method comprising: separately encoding a first set of information bits and a second set of information bits; rate matching the encoded first set of information bits using a first puncturing pattern; rate matching the encoded second set of information bits using a second puncturing pattern; concatenating the encoded and rate matched first set of information bits with the encoded and rate matched second set of information bits, thereby creating a bit stream; and modulating and transmitting the bit stream, wherein the second puncturing pattern has more punctured bits than the first puncturing pattern.

The present disclosure further provides a user equipment comprising: a processor; and a communications subsystem, wherein the processor and communications subsystem are configured to: separately encode a first set of information bits and a second set of information bits; rate match the encoded first set of information bits using a first puncturing pattern; rate match the encoded second set of information bits using a second puncturing pattern; concatenate the encoded and rate matched first set of information bits with the encoded and rate matched second set of information bits, thereby creating a bit stream; and modulate and transmit the bit stream, wherein the second puncturing pattern has more punctured bits than the first puncturing pattern.

The present disclosure further provides a method of operating a user equipment (UE) in a wireless communications network, the method comprising: separately encoding a first set of information bits and a second set of information bits; rate matching the encoded first set of information bits, the rate matching using a first puncturing pattern; rate matching the encoded second set of information bits, the rate matching using a second puncturing pattern; concatenating the encoded and rate matched first set of information bits with the encoded and rate matched second set of information bits, thereby creating a bit stream; and modulating and transmitting the bit stream, wherein the first puncturing pattern has more punctured bits than the second puncturing pattern when the number of component carriers is less than a threshold.

The present disclosure further provides a user equipment comprising: a processor; and a communications subsystem, wherein the processor and communications subsystem are configured to: separately encode a first set of information bits and a second set of information bits; rate match the encoded first set of information bits, the rate matching using a first puncturing pattern; rate match the encoded second set of information bits, the rate matching using a second puncturing pattern; concatenate the encoded and rate matched first set of information bits with the encoded and rate matched second set of information bits, thereby creating a bit stream; and modulate and transmit the bit stream, wherein the first puncturing pattern has more punctured bits than the second puncturing pattern when the number of component carriers is less than a threshold.

Typically, in wireless communication systems, neither the transmitter nor receiver assumes a priori knowledge or unequal error protection of the message bits. However in certain cases a priori knowledge and unequal error protection of message bits does exist and may be taken advantage of. For example, in Carrier Aggregation in the LTE-A system, such a priori knowledge may exist for ACK/NACK transmissions in PUCCH format 3. Further, such knowledge may exist for the channel state information reporting for LTE on a Physical Uplink Shared Channel (PUSCH).

While the disclosure below relates to the Long Term Evolution and Long Term Evolution-Advanced systems, the disclosure is not meant to be limited to such systems and could equally be applied to other systems which may or may not have carrier aggregation.

In LTE systems, communication may be temporally divided into subframes, for example of 1 ms duration, in which bidirectional communication between the user equipment (UE) and a base station are transmitted on some or all of the available component carriers. Additionally, the ratio of downlink to uplink subframes may vary up to a ratio of 9:1 according to traffic needs in the case of a Time Division Duplex (TDD) system.

Reference is now made to FIG. 1, which shows a simplified architecture for communication between various elements in a system for the control plane. A similar protocol stack exists for the user plane. In particular, eNB 110 provides cell coverage to a first area and may serve a UE 120, which communicates with eNB 110 through wireless communication link 122.

As shown in the example of FIG. 1, each element includes a protocol stack for the communications with other elements. In the case of eNB 110, the eNB includes a physical layer 130, a medium access control (MAC) layer 132, a radio link control (RLC) layer 134, a packet data convergence protocol (PDCP) layer 136 and a radio resource control (RRC) layer 138.

In the case of UE 120, the UE includes a physical layer 140, a MAC layer 142, an RLC layer 144, a PDCP layer 146, an RRC layer 147 and a non-access stratum (NAS) layer 148.

Communications between the entities, such as between eNB 110 and UE 120, generally occur within the same protocol layer between the two entities. Thus, for example, communications from the RRC layer at eNB 110 travels through the PDCP layer, RLC layer, MAC layer and physical layer and get sent over the physical layer to UE 120. When received at UE 120, the communications travel through the physical layer, MAC layer, RLC layer, PDCP layer to the RRC level of UE 120. Such communications are generally done utilizing a communications sub-system and a processor, as described in more detail below.

The present disclosure is provided below with regards to a 3GPP LTE architecture. However, the present disclosure is not limited to such architecture and other communications systems could equally be utilized in employing the embodiments provided herein. The present disclosure is thus not limited to 3GPP LTE.

ACK/NACK

In 3GPP LTE, prior to a data transmission on the physical downlink shared channel (PDSCH) in a subframe, the eNB encodes control information on the physical downlink control channel (PDCCH) that is transmitted in the control region. In one embodiment, the control region may consist of up to 4 Orthogonal Frequency Division Multiplex (OFDM) symbols at the beginning of a subframe.

A UE attempts PDCCH decoding at the start of each subframe. Once the UE detects a PDCCH containing PDSCH scheduling information for the UE, the UE performs PDSCH decoding according to the scheduling information included in a detected PDCCH. If a cyclic redundancy check (CRC) of the PDSCH data is successful, which means the PDSCH data is received correctly, the UE transmits an ACK on the physical uplink control channel (PUCCH). In one case, the ACK may be transmitted on the 4th subframe after the PDSCH reception. Alternatively, the ACK transmission may be even later depending on the configuration if the system is TDD. While HARQ-ACK and CSI can be transmitted via Physical Uplink Shared Channel (PUSCH) in certain scenarios, the present disclosure uses transmissions of HARQ-ACK and CSI over PUCCH as an example.

If the CRC check of the PDSCH data is not successful, which means the PDSCH data is not received correctly, the UE can transmit a NACK on the PUCCH to request a retransmission. Typically if no PDCCH is detected by a UE for frequency division duplex (FDD) in LTE Rel-8 specifications, then no acknowledgement, either positive or negative, is indicated on the uplink PUCCH. This is referred to as discontinuous transmission (DTX). While ideally three HARQ responses (ACK, NACK, DTX) are possible, to simplify the transmission it is also possible to use two HARQ responses (ACK, NACK) for a data packet where DTX and NACK are both represented by NACK. Thus only one bit is needed to represent the HARQ response. For example, each positive acknowledgement (ACK) is encoded as a binary '1' and each negative acknowledgement (NACK) is encoded as a binary '0'. In LTE, a PDSCH may carry one or two transport blocks (TBs). Each TB on the downlink needs one HARQ-ACK bit in response on the uplink. Thus a PDSCH transmission requires one or two HARQ-ACK bits in response, depending on the number of TBs carried by the PDSCH.

In LTE, carrier aggregation may be used in order to support a wider transmission bandwidth for increased potential peak data rates. In carrier aggregation, multiple component carriers (CCs) are aggregated and can be allocated in a subframe to a UE. Thus, each component carrier may have a bandwidth of, for example, 20 MHz and a total aggregated system bandwidth could reach 100 MHz when five component carriers are aggregated. The UE may receive or transmit on multiple component carriers depending on the UE' capabilities. Further, carrier aggregation may occur with carriers located in the same band and/or carriers located in different bands. For example, one carrier may be located at 2 GHz band and a second aggregated carrier may be located at 800 MHz band.

Currently, a UE may receive on a multiple of up to five downlink component carriers, depending on the UE's capabilities and deployment scenario. Multiple PDSCHs can be scheduled to one UE in the same subframe, but on different carriers, and multiple PDSCHs may be decoded in parallel.

In order to save UE battery power, one example of signaling includes the UE transmitting multiple ACKs or NACKs on one PUCCH in the uplink primary component carrier (PCC).

As a potential mismatch could arise between the UE and eNB understandings of the HARQ-ACK payload size if a transmitted PDCCH is not detected by the UE, the HARQ-ACK payload size is based on the number of configured CCs and configured TBs per component carrier. Therefore the HARQ-ACK payload size is not dependent on the successful decoding of all PDCCH messages and hence remains constant in a semi-static sense. In other words, the HARQ-ACK payload size does not change dynamically. Since the number of configured CCs is given by RRC signaling, the RRC signaling may change the number of configured CCs. In a TDD system, the number of HARQ-ACK bits can be determined by both the number of configured CCs and the downlink (DL) or uplink (UL) subframe ratio or the value in the downlink assignment index (DAI) information to support the case when the HARQ-ACK bits of multiple downlink subframes are transmitted in one uplink subframe.

When the number of HARQ-ACK bits is determined based on the number of configured CCs and the number of configured TBs per configured CC, if a PDCCH is received on at least one of the configured CCs, then NACKs are sent for all other CCs on which no PDCCH has been detected. If a PDCCH is detected then the UE makes an attempt to receive the corresponding PDSCH data. If the PDSCH decoding is successful, the UE sends a positive acknowledgement message to the eNB and otherwise a negative acknowledgement is indicated. In the case of a CC being configured for dual-transport block transmission, two HARQ-ACK bits per subframe may be used for that CC, whereas for a carrier configured for a single transport block only one HARQ-ACK bit per subframe may be necessary.

Figure 2:
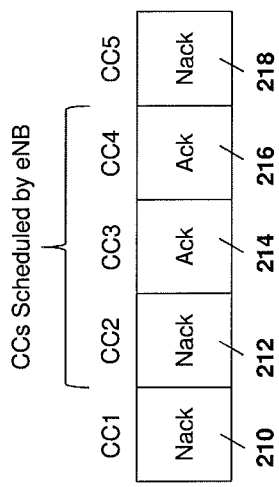
FIG. 2 is a schematic diagram showing an example ACK/NACK transmission.

Reference is now made to FIG. 2. As shown in FIG. 2, a UE receives data from five component carriers, namely component carriers 210, 212, 214, 216 and 218 respectively.

In a particular subframe, the component carriers 212, 214 and 216 are scheduled by an eNB to send data to a UE. In this case, the eNB will indicate via the PDCCH that component carriers 212, 214 and 216 have data and the UE will then try to decode component carriers 212, 214 and 216.

Component carriers 210 and 218 are not used in the subframe. For the HARQ response, the UE signals an ACK or an NACK for component carriers 212, 214 and 216 depending on whether or not the decoding of the PDSCH was successful for those component carriers. For component carriers 210 and 218, the UE will send a NACK to represent DTX.

Thus, an eNB will have a priori knowledge for the response of component carriers 210 and 218. In particular, the eNB knows which component carriers and subframes PDCCH and PDSCH transmissions did not occur on and thus has a priori knowledge that NACKs will be indicated for those resources provided at least one PDCCH and therefore one PDSCH was scheduled in the subframe. If no information was scheduled in the subframe then the UE is expected to send NACK (=DTX) and not expected to transmit an ACK in the HARQ response.

Thus, a UE will signal NACKs for both the case of a non-detection of a PDCCH and the case of an unsuccessful PDSCH decoding when a PDCCH was detected. However, the detection in the eNB can utilize the a priori knowledge that any HARQ-ACK bits corresponding to component carriers and subframes where a PDCCH was not transmitted must have a value of "NACK".

CSI

As defined in section 5.2.2.6.4 of the 3GPP Technical Specification (TS) 36.212, V.10.4.0, "Technical Specification Group Radio Access Network; Evolved Universal Terrestrial Radio Access (E-UTRA); Multiplexing and channel coding (Release 10)", the contents of which are incorporated herein by reference, CSI transmitted on the physical uplink control channel is coded using a single Reed-Muller (RM) code in 3GPP LTE Rel-8, Rel-9, and Rel-10. The RM code is a linear error correcting code used in communications. In the case of the 3GPP TS 36.212, the RM code can be used with a 32-bit code word with a payload up to 11 bits. In other embodiments, the CSI transmitted on the PUCCH is coded using a single RM code (20, A) for payload sizes up to 13 bits.

The encoding with an RM code provides a decreasing reliability for the information bits and an increasing bit error probability as the information bits move from the most significant bit to the least significant bit.

Figure 3:
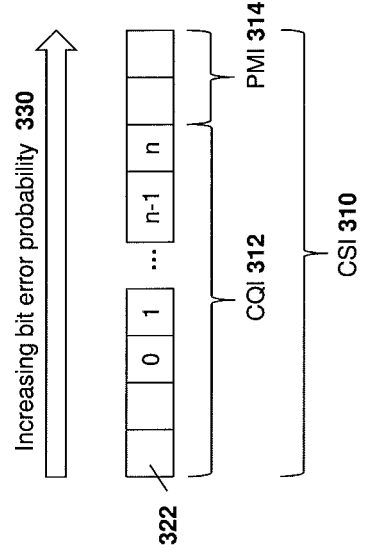
FIG. 3 is a schematic diagram showing CSI payload ordering in LTE.

In particular, as shown in FIG. 3, the CSI 310 includes the CQI 312 and PMI 314. The RM encoded bits 322 are shown from the most significant bit to the least significant bit of the CQI and with the PMI appended thereto. As shown by arrow 330, increased bit error probability occurs when moving from the most significant bit to the least significant bit of the CQI and to the PMI.

Thus, the payload ordering for the CQI portion of the CSI message is the order of the most significant bit to the least significant bit of the CQI message. This ordering complements the unequal bit error probability characteristics present on RM codes where the most significant information bit of the encoded message is less likely to be in error than the least significant information bit since the most significant bits of a CQI message have a greater impact in an erroneous CQI report than the least significant bits. However, in some embodiments the PMI has greater sensitivity to error, but still occupies the least significant bit positions which are the most likely impacted by decoder failure in a Rel-8 LTE system.

In one Rel-10 LTE system, dual RM coding is used when the number of HARQ-ACK bits is more than 11 bits. This is to allow a large number of HARQ-ACK bits to be transmitted in the case where multiple carriers are aggregated. This may be most common, for example, in the case of TDD where up to 40 HARQ-ACK bits could be required, assuming 5 carriers are aggregated and 4 subframes are scheduled with two transport blocks per carrier for TDD uplink/downlink configuration 2. However, since such large HARQ-ACK signaling can cause a burden in control signaling, a limit of up to 20 HARQ-ACK bits to be transmitted may be used and spatial bundling may be applied when the number of HARQ-ACK bits is more than 20.

Since the RM coding used for CSI transmission supports up to 11 bits, two RM encoders are used to transmit up to 22 bits.

For simplicity, the descriptions below do not include the application of an orthogonal cover sequence and cyclic shift. However, in application these are applied before a discrete Fourier transform (DFT) processing to transmit HARQ-ACK in PUCCH format 3.

As indicated above, Rel-10 carrier aggregation may cause a periodic CSI to be dropped if HARQ-ACK is transmitted in the same subframe. In the LTE Rel-11 specifications, simultaneous transmission of CSI and HARQ-ACK is proposed when HARQ-ACK is transmitted on PUCCH format 3. In the description below, the uplink transmission focuses on simultaneous transmission of two types of information: HARQ-ACK and CSI. It is appreciated by those skilled in the art that other types of information can be concatenated and/or interleaved on the same uplink transmission as needed by following the same principles. An example of other types of information that can be transmitted simultaneously with HARQ-ACK and CSI includes a scheduling request (SR).

One possible way to do this is to reuse the dual RM coding to increase the payload size that the UE can transmit on PUCCH format 3. As indicated above, the dual RM code can support a payload of up to 22 bits.

Figure 4:
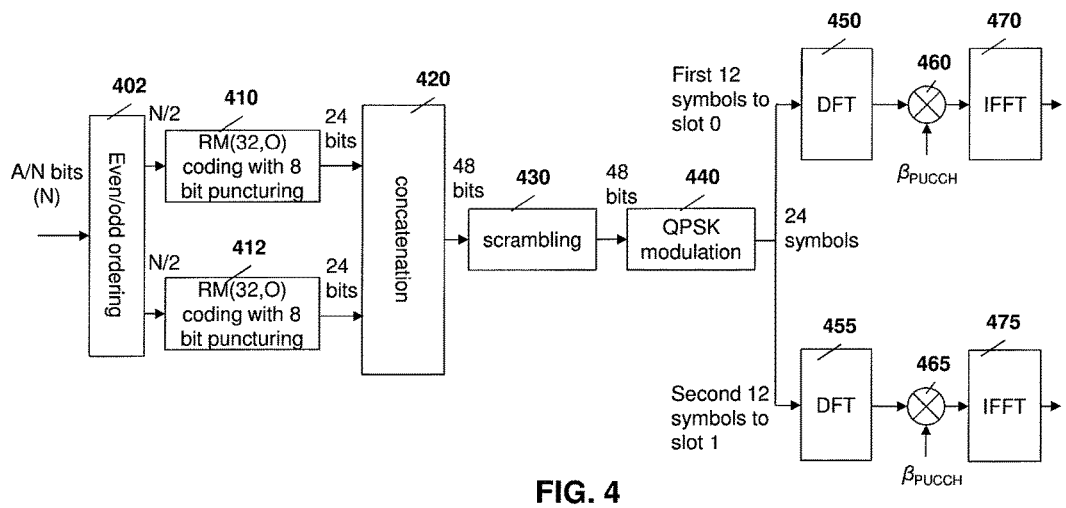
FIG. 4 is a schematic diagram showing a conventional coding structure for HARQ-ACK.

Reference is now made to FIG. 4 which provides an example of HARQ-ACK coding with dual RM codes. In particular, in the example of FIG. 4, HARQ ACK/NACK bits are even and odd ordered at block 402, and each ordered block is RM encoded with 8 bits punctured from the length-32 code thus providing codewords of 24 bits. This is shown with blocks 410 and 412. However, other types of ordering are also possible, and may include, for example, first half and second half. The present disclosure is not limited to any particular HARQ-ACK coding.

The output from blocks 410 and 412 are provided to concatenation block 420 which then concatenates the bits and provides a 48-bit output.

The concatenation block output is provided to a scrambling block 430 which provides an XOR with a random sequence to produce 48 bits, which are then modulated at modulation block 440. In the example of FIG. 4, the modulation is quadrature phase shift keying (QPSK) modulation. However, other modulation techniques are possible.

The output from the QPSK modulation block 440 is 24 symbols, which are then divided into the first 12 symbols going to a discrete Fourier transform (DFT) block 450, and the second 12 symbols being provided to a second DFT block 455.

The output from DFT block 450 is then multiplied by a power level for the first block, as shown by block 460. Similarly, the output of DFT block 455 is multiplied by a power level the second block, shown at block 465.

The output from the multiplication at block 460 is then provided to an inverse fast Fourier transform (IFFT) block 470 and the output is then sent to the network. In the example of FIG. 4, the output from block 470 is sent over slot 0 of the subframe.

Similarly, the output from multiplication block 465 is provided to the IFFT block 475, and the output of the multiplication is then sent to the network element. In the example of FIG. 4, the output from block 475 is sent over slot 1 of the subframe In an alternative embodiment, instead of providing for concatenation block 420, separate scrambling and modulation blocks 430 and 440 may be provided for the output from each of blocks 410 and 412 respectively.

PUCCH Reporting and Mapping

The channel state information report from a UE consists of a channel quality indicator, precoding matrix indicator, precoding type indicator (PTI), and rank indication (RI), which are controlled by the eNB. In addition, HARQ-ACK/NACK is also fed back from a UE to the eNB as the acknowledgement of the downlink transmitted data.

For uplink control information, both periodic and aperiodic reports may be supported either for wideband or for sub-bands. These periodic or aperiodic reports are provided, for example in 3GPP TS36.211, "Evolved Universal Terrestrial Radio Access (E-UTRA); Physical channel and modulation", Release 10; the 3GPP TS36.212, "Evolved Universal Terrestrial Radio Access (E-UTRA); Multiplexing and channel coding", Release 10; and 3GPP TS36.213, "Evolved Universal Terrestrial Radio Access (E-UTRA); Physical layer procedures", Release 10, the contents of all of which are incorporated herein by reference.

Figure 5:
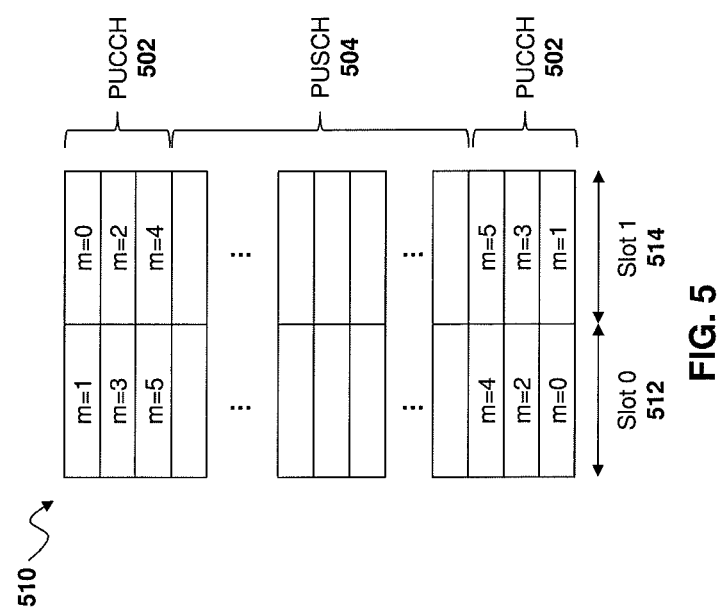
FIG. 5 is a block diagram showing PUCCH mapping on a physical resource block.

A CSI report, including the HARQ-ACK/NACK message, provides the link capability to support spectral efficiency on a downlink transmission. As seen in FIG. 5, periodic CSI reports are performed on the physical uplink control channel that is located at the edges of the system bandwidth to achieve frequency diversity of the transmitted data and provide fewer constraints on system designs.

In PUCCH format 3, the actual number of ACK/NACK feedback bits is determined from the number of configured component carriers. For FDD, a maximum payload size of 10 ACK/NACK bits is allowed, while for TDD, the maximum payload size may be up to 20 bits. Thus, the maximum payload size carried by a PUCCH format 3 in Release 10 is 21 bits, corresponding to 20 bits of ACK/NACK information and one bit for an SR appended at the end of the ACK/NACK bits.

After performing RM encoding as described above with regard to FIG. 4, the block of 48 bits is then scrambled with a UE-specific scrambling sequence using a modulo-2 operation. The block of scrambled bits is modulated using QPSK modulation resulting in a block of 24 complex-valued modulation symbols.

Reference is now made to Table 1, which shows supported PUCCH formats. As seen, the PUCCH format 3 has up to 24 bits per subframe and is provided for multiple ACK/NACKs for carrier aggregation with up to 20 ACK/NACK bits and an optional SR in 48 codes bits.

TABLE 1

Supported PUCCH formats

| PUCCH format | Modulation scheme | Number of bits per subframe, $M_{bit}$ | Uplink control information |
|---|---|---|---|
| 1 | N/A | N/A | SR |
| 1a | BPSK | 1 | HARQ-ACK/NAC with(out) SR |
| 1b | QPSK | 2 | HARQ-ACK/NAC with(out) SR |
| 2 | QPSK | 20 | CSI |
| 2a | QPSK + BPSK | 21 | CSI and 1-bit HARQ-ACK/NACK |
| 2b | QPSK + QPSK | 22 | CSI and 2-bit HARQ-ACK/NACK |
| 3 | QPSK | 48 | Multiple ACK/NACKs for carrier aggregation: up to 20 ACK/NACK bits + optional SR, in 48 coded bits |

In Table 1, $M_{bit}$ represents the number of bits for a symbol mapper.

The complex-valued symbols may be block-wise spread with the two orthogonal sequences of length-5 each in the normal PUCCH 3 format, resulting in 10 symbols of 12 complex-valued modulation symbols. Each set of complex-valued symbols may be cyclically shifted and the shifted set of complex-valued symbols may be transform pre-coded.

In order to provide for better transmissions, frequency diversity may be exploited. Frequency diversity provides for increased reliability of message signals by transmitting using several frequency channels or spread over wide spectrum that is affected by frequency selective fading.

PUCCH in LTE is designed to exploit frequency diversity to minimize the resources for transmission of control signalling. The control signal on a PUCCH may be configured on the edges of the system bandwidth. Mapping of modulation symbols for PUCCH onto a physical resource block is shown, for example, with regard to FIG. 5.

Referring to FIG. 5, the PUCCH 502 is provided at either end of a system bandwidth 510, surrounding a PUSCH 504. In particular, each slot 512 and 514 may have data for the PUCCH. In the embodiment of FIG. 5, the data at the beginning of the system bandwidth 510 is alternated between slot 0 and slot 1 at the beginning and at the end of the system bandwidth 510.

Locating the PUCCH at the edges of the system bandwidth provides various benefits. A first benefit is that such location of the PUCCH maximizes frequency diversity via frequency hopping. A second benefit is that smaller out-of-band emissions between PUSCH transmission of adjacent carriers is experienced. Further, such location of the PUCCH prevents system constraints on uplink scheduling.

Thus, in accordance with the example of FIG. 5, twelve symbols for PUCCH are provided, six at the beginning of the resource block 510 and six at the end of resource block 510.

Repeat-Accumulate Code

Repeat-accumulate codes are a low complexity class of error-correcting codes. RA codes allow an ensemble weight distribution to be easily derivable. RA codes, for examples, are provided by D. Divsalar, et al, "Coding theorems for 'turbo-like' codes." Proc. 36th Allerton Conf. on Communication, Control and Computing, Allerton, Ill., September 1998, pp. 201-210.

In an RA code, an information block of length-N is repeated q times, scrambled by an interleaver of size qN, and then encoded by a rate-1 accumulator. The accumulator may be viewed as a recursive convolutional encoder with a transfer function 1/(1+D). As a block code, input block ($x_1$, $x_2$, ..., $x_n$) and output block ($y_1$, $y_2$, ..., $y_n$) are expressed by:

$$y_1 = x_1$$

$$y_i = y_{i-1} + x_i \text{ for } i > 1 \quad (1)$$

As seen in equation 1 above, if i is greater than 1 then $y_i$ equals a previous value of y plus the current value of x.

RA codes are linear and nonsystematic, and have a rate of 1/q.

Separate Coding

As indicated above, CSI might be dropped if an HARQ-ACK is to be transmitted in the PUCCH format 3 of the CSI. In LTE Release 11 carrier aggregation, especially for FDD, a question exists for whether to support simultaneous transmission of CSI and HARQ-ACK when HARQ-ACK is transmitted on PUCCH format 3, as opposed to simply dropping the periodic CSI reporting.

One possible approach is to reuse the dual RM coding to increase a payload size that a UE can transmit on PUCCH format 3, such as that used by Rel-10 TDD. Since each RM code can support up to 11 bits, the dual RM code can support a payload of up to 22 bits.

One embodiment in accordance with the present disclosure may include information bit mapping and multiplexing/demultiplexing of HARQ-ACK and CSI bits, including the location of HARQ-ACK and CSI bits before encoding.

A further embodiment may include enablement of differential reliability control for HARQ-ACK and CSI feedbacks. A target reliability of HARQ-ACK is $10^{-4}$-$10^{-3}$ NACK to ACK errors. Similarly, the target block error rate of CSI is $10^{-2}$-$10^{-1}$. Although HARQ-ACK and CSI are transmitted in the same channel, one issue for simultaneous transmission of CSI and HARQ-ACK is how to meet different reliability for each information type.

The present disclosure provides for concatenation, rate matching and/or puncturing and mapping for simultaneous transmission for HARQ-ACK and periodic CSI, allowing HARQ-ACK and periodic CSI transmission to achieve a desired error performance. Specifically, in accordance with the present disclosure, modified control signalling schemes are provided that allow more feedback signals at the receiver by maximizing the diversity gain for both HARQ-ACK and periodic CSI signals together by interleaved mapping or different coding rates.

Various possible ways of multiplexing HARQ and periodic CSI signalling are provided in accordance with the embodiments below. Such schemes include separate coding with bit-interleaved mappers; separate coding with higher order modulation; and separate coding with different coding rates.

Separate Coding with Bit-Interleaved Mappers

In accordance with one embodiment of the present disclosure, a process is provided for simultaneously transmitting both HARQ-ACK and period CSI reports on PUCCH format 3. Since the error performance of the RM code is degraded depending on the puncturing patterns or the number of punctured bits, mapping rules may improve error performance of the punctured bits.

In the case where both HARQ-ACK and CSI reports are jointly encoded and rate matching is performed after joint encoding at the joint coding scheme, the differential reliability for HARQ-ACK and CSI feedbacks may not easily be achieved. Thus, in accordance with one embodiment of the present disclosure, bit mapping and concatenation occur after rate matching to achieve improved error performance than only the use of concatenation.

Figure 6:
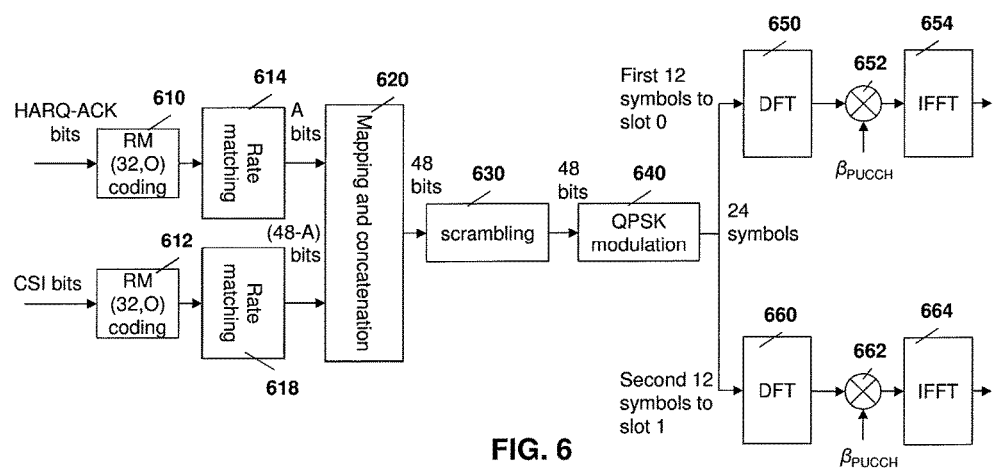
FIG. 6 is a schematic diagram showing a conventional coding structure for HARQ-ACK including a mapping function.

Reference is now made to FIG. 6. FIG. 6 shows an exemplary structure of HARQ-ACK and CSI coding utilizing one approach in the accordance with the present disclosure.

In particular, in the example of FIG. 6, HARQ-ACK and CSI are each RM encoded, as shown by blocks 610 and 612, respectively. The example of FIG. 6 has equal puncturing, and thus the encoding at blocks 610 and 612 produce 32 bits for the HARQ-ACK bits and 32 bits for the CSI bits.

Subsequently, the encoded HARQ-ACK bits are rate matched at block 614 to produce A bits. The encoded CSI bits are rate matched at block 618 to produce (48-A) bits. In one embodiment, the parameter A is signaled by the eNB via higher layer signaling such as RRC signaling. In another embodiment, the parameter A is preconfigured and no signaling is needed.

The output from blocks 614 and 618 are provided to mapping and concatenation block 620. At mapping and concatenation block 620 the HARQ-ACK bits are mapped with the CSI bits.

Figure 7:
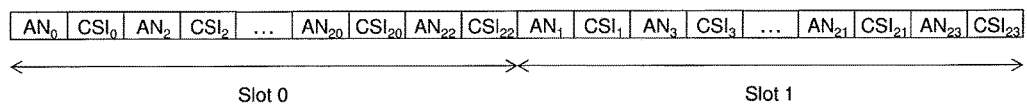
FIG. 7 is a block diagram of an example mapping structure for separate coding.

For example, reference is now made to FIG. 7, which shows a mapping structure for separate coding, having equal puncturing or rate matching. As seen in FIG. 7, a slot 0 includes ACK/NACK bit 0 followed by CSI bit 0, followed by ACK/NACK bit 2 and CSI bit 2 etc. Similarly, for slot 1, ACK/NACK bit 1 and CSI bit 1 follow each other, which is then followed by ACKN/NACK bit 2 and CSI bit 3. In this way, the ACK/NACK bit is interleaved with the CSI bit.

The mapping of the HARQ and CSI bits maximizes frequency and time diversity and bit-interleaved effect, such as bit-interleaved coded modulation (BICM).

In accordance with the embodiment of FIG. 7, the even numbers bits of each HARQ-ACK and CSI feedback are in the first slot and can be placed in an upper edge of a physical resource block, while the odd numbered bits of each HARQ-ACK and CSI feedback are in the second slot and can be placed at a lower edge of a physical resource block and vice versa.

If the number of HARQ-ACK bits does not equal 24 then there could be more or less HARQ-ACK bits then CSI bits. In this case, once the interleaving reaches the end of the HARQ-ACK bits or CSI bits, whichever is shorter, the remaining bits will then be filled with the remainder of the HARQ-ACK or CSI bits, where the odd bits are placed in slot 1 and the even bits are placed in slot 0 in accordance with the embodiment of FIG. 7.

The example of FIG. 7 is however not meant to be limiting and shows just one possibility for a mapping structure.

Referring again to FIG. 6, the output from mapping and concatenation block 620 provides 48 bits, which are then scrambled at block 630, and modulated at block 640. In the example of FIG. 6, the modulation is QPSK modulation. However, other modulation techniques could also be use, such as high order modulation types.

The output from modulation block 640 is 24 symbols of which: 12 symbols are provided to a first discrete Fourier transform (DFT) block 650; and 12 symbols are provided to a second discrete Fourier transform block 660.

The output from DFT block 650 is multiplied by a power level for the slot on the PUCCH, as shown by block 652 and then provided to an inverse fast Fourier transform (IFFT) block 654.

Similarly, output from block 660 is provided to multiplier block 662 which multiplies by a power level for the second slot of the PUCCH. The output from block 662 is then provided to IFFT block 664.

The outputs from block 654 and 664 are then sent to the network.

Since rate matching occurs after dual RM encoding, both code rates increase, thus providing slightly worse error performance than in the case without puncturing. In accordance with the present disclosure, QPSK symbols consist of 2 bits, each bit of which is from an HARQ-ACK and CSI feedback.

Thus, from FIGS. 6 and 7, the example shows a mapping structure with equal puncturing or rate matching from both the $1^{st}$ and $2^{nd}$ RM codes. The even bits of both coded HARQ and CSI feedbacks are mapped to the top of the band edge while the odd ones are mapped to the bottom of the band edge, as seen above with regard to FIG. 5. The separate coding mapping structure above maximizes frequency and time diversity by interleaving the bits from the CSI and HARQ-ACK.

If the above is implemented for a Long Term Evolution system, the 3GPP Technical Specification (TS) 36.212, V.10.4.0, "Technical Specification Group Radio Access Network; Evolved Universal Terrestrial Radio Access (E-UTRA); Multiplexing and channel coding (Release 10)", and specifically Section 5.2.3.1 may be changed in accordance with Appendix A.

As seen in Appendix A, the channel coding is now for both the UCI HARQ-ACK and for CSI. Additionally CSI bits can be transmitted simultaneously with HARQ-ACK. Further, as seen in Appendix A the channel coding provides for the interleaving of the ACK/NACK bits and the CSI bits.

Separate Coding with Higher Order Modulation

In a further embodiment of the present disclosure, a higher-order modulation may be used to maximize the frequency diversity or exploit a simple channel coding.

After performing rate matching, the number of combined output bits is 48 for QPSK modulation. In order to increase capacity of control channels, two alternatives are provided in the present disclosure. A first is to assign new resources for supporting more control channels and the other is to make spectral efficiency higher under the same assumptions.

With regard to a hybrid modulation scheme, depending on the number of configured CCs, different modulation schemes may be adopted. If the number of configured CCs is small, then the overall code rate for the HARQ-ACK feedback becomes lower. In this case, higher modulation may be used to make the operating signal to noise ratio (SNR) higher instead of using puncturing patterns.

For example, reference is now made to Table 2 below.

TABLE 2

Hybrid modulation schemes depending on the number of the configured CCs

| $N_{HARQ-ACK,in}$ | Code rate before rate matching | Modulation Scheme | Puncturing pattern with target $[N_{HARQ-ACK}, N_{CSI}] = [30, 18]$ |
|---|---|---|---|
| 1-2 | 1/32-2/32 | 16-QAM | No puncturing |
| 3-4 | 3/32-4/32 | | |
| 5-6 | 5/32-6/32 | QPSK | HARQ-ACK: |
| 7-8 | 7/32-8/32 | | [111111111111111101111111111111110] |
| 9-10 | 9/32-10/32 | | CSI: [110101011101010011010101111010100] |

In Table 2, when the number of CCs is lower than a threshold then the 16-Quadrature Amplitude Modulation (QAM) scheme may be used. Thus, for example, in Table 2 when up to 4 bits of $N_{HARQ-ACK,in}$ are present, then 16-QAM modulation is used with no puncturing.

When no puncturing is used, all encoded HARQ-ACK feedback is transmitted using 16-QAM and all encoded CSI feedback is repeated two times and mapped onto 16-QAM.

Alternatively, if the number of $N_{HARQ-ACK,in}$ bits is between 5 and 10, then QPSK modulation is used. In the example of Table 2, bit masks are provided which show which bits are transmitted and which bits are punctured. "1" means the corresponding bit is transmitted while "0" means the corresponding bit is punctured. In the embodiment of Table 2, 30 HARQ-ACK bits are transmitted while 18 CSI bits are transmitted. The higher puncturing of the CSI bits permits better error performance for the HARQ-ACK bits. The puncturing patterns in Table 2 are however merely examples and other puncturing patterns are possible.

Therefore, in accordance with Table 2 a hybrid modulation scheme is provided where higher order modulation is used when there are fewer $N_{HARQ-ACK}$ bits.

Figure 8:
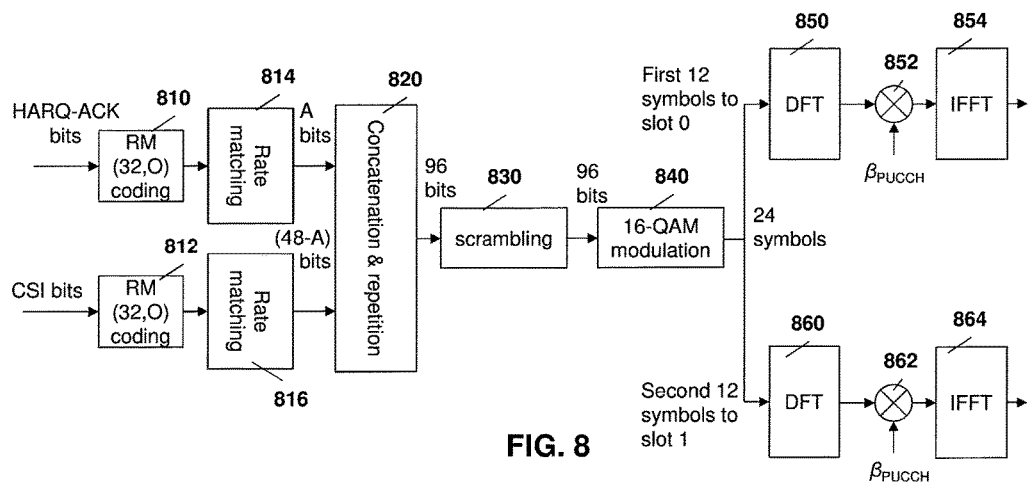
FIG. 8 is a schematic diagram showing a conventional coding structure for HARQ-ACK including a repetition and higher order modulation.

In an alternative embodiment, instead of hybrid modulation schemes, higher modulation schemes may be used. Reference is now made to FIG. 8.

As seen in FIG. 8, the 48 bits provided after RM blocks 810 and 812 and rate matching blocks 814 and 816 are provided to concatenation and repetition block 820.

Concatenation and repetition block 820 repeats each bit two times. The 96 bits are then scrambled at block 830 and modulated with 16-QAM at block 840. The 16-QAM modulation provides 12 symbols of which the first 12 are provided to DFT block 850 and the second 12 symbols are provided to DFT block 860.

Further, the RA codes described above can be used with the present embodiment and may further add performance improvement for the decoding. The RA code may be applied in concatenation and repetition block 820, for example.

The output from DFT block 850 is then multiplied by a power level for the PUCCH, as shown at block 852 and output to an IFFT at block 854. Similarly, the output of DFT block 860 is multiplied with the power for the PUCCH at block 862 and the output from block 862 is provided to IFFT block 864.

In accordance with one embodiment of the present disclosure, block 820 can further perform mapping and interleaving in a similar manner to block 620 from FIG. 6.

Figure 9:
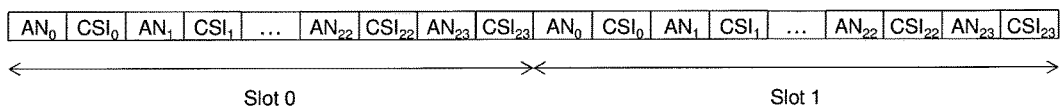
FIG. 9 is a block diagram of an example mapping structure for separate coding with repetition.

Reference is now made to FIG. 9. As seen in FIG. 9, the bits may be interleaved. However, since there are 48 bits within each slot the interleaving can allow for ACK/NACK bit 0 and CSI bit 0 to be followed by ACK/NACK bit 1 and CSI bit 1 in slot 0. Thus, all 24 bits for the ACK/NACK and for the CSI are provided both in slot 0 and in slot 1.

In one embodiment, interleaving structure may also be applied after scrambling instead of applying the interleaving at the concatenation block.

To transmit both the HARQ-ACK and CSI feedback simultaneously, 16-QAM may be applied with a proper rate matching and repetition if the QPSK block 640 of FIG. 6 is replaced with a 16-QAM block 840 of FIG. 8.

Separate Coding with Different Coding Rates

In a further alternative embodiment, a process is provided for different rate matching schemes depending on how much reliability is required by the receiver. As provided in FIG. 4 above, input bits for mapping and concatenation block consist of two different punctured code bits, each of which is for HARQ-ACK and CSI feedbacks respectively. The error performance required for the HARQ-ACK feedback is, in general, better than that for the CSI feedback. Thus, different code rates may be required for both the HARQ-ACK and CSI coded bits. In other words, under the same wireless channel conditions, a lower code rate for the HARQ-ACK feedback is required than that of CSI feedback.

The number of the output bits after rate matching are given by equation 2 below.

$$N_{HARQ-ACK} = f_1\left(\frac{N_{HARQ-ACK,in}}{32}\right) \quad (2)$$

$$N_{CSI} = f_2\left(\frac{N_{CSI,in}}{32}\right)$$

In equation 2, the $N_{HARQ-ACK}$ and $N_{CSI}$ are the number of coded bits from a dual RM codes after rate matching respectively. $f_1$ and $f_2$ are puncturing functions for rate matching respectively, and $N_{HARQ-ACK,in}$ and $N_{CSI,in}$ are the number of input bits for the dual RM codes, respectively.

The number 32 in equation 2 represent the number of output bits after the RM coding.

Puncturing functions $f_1$ and $f_2$ may be configured depending on the importance of HARQ-ACK and CSI feedbacks. Various assumptions may exist for the input and output bits and may include, for example, that the number of HARQ-ACK bits and the number of CSI bits is equal to 48. Further, the number of input bits for the HARQ-ACK is between 0 and 10 for a frequency division duplex. Further, the number of input bits for CSI is between 0 and 11.

Based on the above assumptions, each code rate is given in accordance with equation 3 below.

$$CR_{HARQ-ACK} = \frac{N_{HARQ-ACK,in}}{N_{HARQ-ACK}} \quad (3)$$

$$CR_{CSI} = \frac{N_{CSI,in}}{N_{CSI}}$$

In Equation 3, $CR_{HARQ-ACK}$ and $CR_{CSI}$ are the actual code rate for HARQ-ACK and CSI feedbacks after rate matching, respectively. To achieve a better error performance for HARQ-ACK, the actual code rate for the $CR_{HARQ-ACK}$ is less than or equal to $CR_{CSI}$.

An appropriate code rate for each RM code or value of A (=$N_{HARQ-ACK}$) is a function of $N_{HARQ-ACK,in}$, $N_{CSI,in}$, $f_1$, $f_2$, and the required SNRs for HARQ-ACK and CSI feedbacks to achieve an error performance dependent on wireless channel conditions.

In accordance with the present disclosure, two alternative embodiments exist. In a first alternative, the $N_{HARQ-ACK}$ is fixed, regardless of the number of the configured CCs. In a second alternative, variable puncturing is provided for $CR_{HARQ-ACK}$ In the fixed $N_{HARQ-ACK}$ solution, regardless of the configured CCs, the number of output bits from the HARQ-ACK feedback remains fixed. Furthermore, the CSI feedback has higher puncturing than the HARQ-ACK feedback in order to achieve an error performance for the HARQ-ACK feedback that is better than that for the CSI feedback.

One example is shown below with regard to Table 3. Table 3 illustrates puncturing patterns where the $N_{HARQ-ACK}$=30 $N_{CSI}$=18.

TABLE 1

Puncturing patterns for fixed $N_{HARQ-ACK}$

| $N_{HARQ-ACK}$ | Code rate before rate matching | Puncturing pattern with target [$N_{HARQ-ACK}$, $N_{CSI}$] = [30, 18] |
| --- | --- | --- |
| 1-2 | 1/32-2/32 | HARQ-ACK: |
| 3-4 | 3/32-4/32 | [111111111111111011111111111110] |
| 5-6 | 5/32-6/32 | CSI: |
| 7-8 | 7/32-8/32 | [110101011101010011010101111010100] |
| 9-10 | 9/32-10/32 | |

As seen from Table 3 above, the puncturing pattern remains the same, regardless of the number of CCs configured. In Table 3, a "0" indicates punctured bits and a "1" indicates non-punctured bits.

In a second alternative embodiment, variable puncturing may be provided for the code rate for HARQ-ACK. In this alternative, the payload size of HARQ-ACK feedback is dependent on the number of configured CCs. As seen above with regard to FIG. 4, the number of output bits from the RM code for the HARQ-ACK feedback is 32 bits. That is, the code rate becomes lower if the number of configured CCs is smaller.

Thus, in the alternative embodiment, depending on the number of configured CCs, the puncturing rate may be varied. In other words, the smaller the number of configured CCs, the more output bits are punctured. Higher numbers of HARQ-ACK bits that are punctured lead to more CSI reporting information that can be transmitted.

One example is shown below with regard to Table 4, which shows that more coded bits for HARQ-ACK feedback are punctured from the outputs of the RM code if the number of configured CCs is less than 7, while less coded bits are punctured if $N_{HARQ-ACK,in}$ is more than 6.

TABLE 2

Puncturing patterns for variable $CR_{HARQ-ACK}$

| $N_{HARQ-ACK,in}$ | Code rate before rate matching | Puncturing pattern with target $CR_{HARQ-ACK}$ |
| --- | --- | --- |
| 1-2 | 1/32-2/32 | HARQ-ACK: |
| 3-4 | 3/32-4/32 | [10101010101010101010101010101010] |
| 5-6 | 5/32-6/32 | (16) |
| | | CSI: |
| | | [11111111111111111111111111111111] |
| | | (32) |
| 7-8 | 7/32-8/32 | HARQ-ACK: |
| 9-10 | 9/32-10/32 | [111011101110111011101110111011101110] |
| | | (24) |
| | | CSI: |
| | | [111011101110111011101110111011101110] |
| | | (24) |

Specifically, for Table 4, the puncturing for the HARQ-ACK when the number of input HARQ bits is less than 7 includes 16 bits for puncturing the HARQ-ACK and 32 bits for puncturing the CSI.

Once the number of input HARQ bits reaches 7 then the puncturing results in 24 HARQ bits and 24 CSI bits.

The variable puncturing allows better error performance for the HARQ-ACK to be maintained while allowing more CSI bits if there are fewer CCs configured. In one embodiment, the variable puncturing may be configured by the eNB or preconfigured by the standards.

The above may be implemented by any network element. A simplified network element is shown with regard to FIG. 10.

Figure 10:
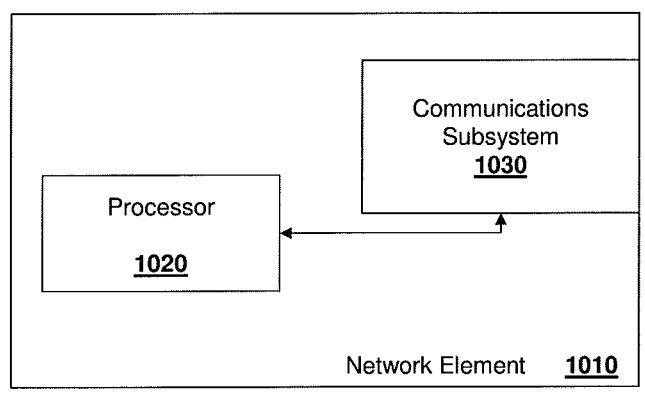
FIG. 10 is a block diagram showing a simplified example network element.

In FIG. 10, network element 1010 includes a processor 1020 and a communications subsystem 1030, where the processor 1020 and communications subsystem 1030 cooperate to perform the methods described above.

Further, the above may be implemented by any UE. One exemplary device is described below with regard to FIG. 11.

UE 1100 is typically a two-way wireless communication device having voice and data communication capabilities. UE 1100 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1100 is enabled for two-way communication, it may incorporate a communication subsystem 1111, including both a receiver 1112 and a transmitter 1114, as well as associated components such as one or more antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate. The radio frequency front end of communication subsystem 1111 can be any of the embodiments described above.

Network access requirements will also vary depending upon the type of network 1119. In some networks network access is associated with a subscriber or user of UE 1100. A UE may require a removable user identity module (RUIM) or a subscriber identity module (SIM) card in order to operate on a network. The SIM/RUIM interface 1144 is normally similar to a card-slot into which a SIM/RUIM card can be inserted and ejected. The SIM/RUIM card can have memory and hold many key configurations 1151, and other information 1153 such as identification, and subscriber related information.

Figure 11:
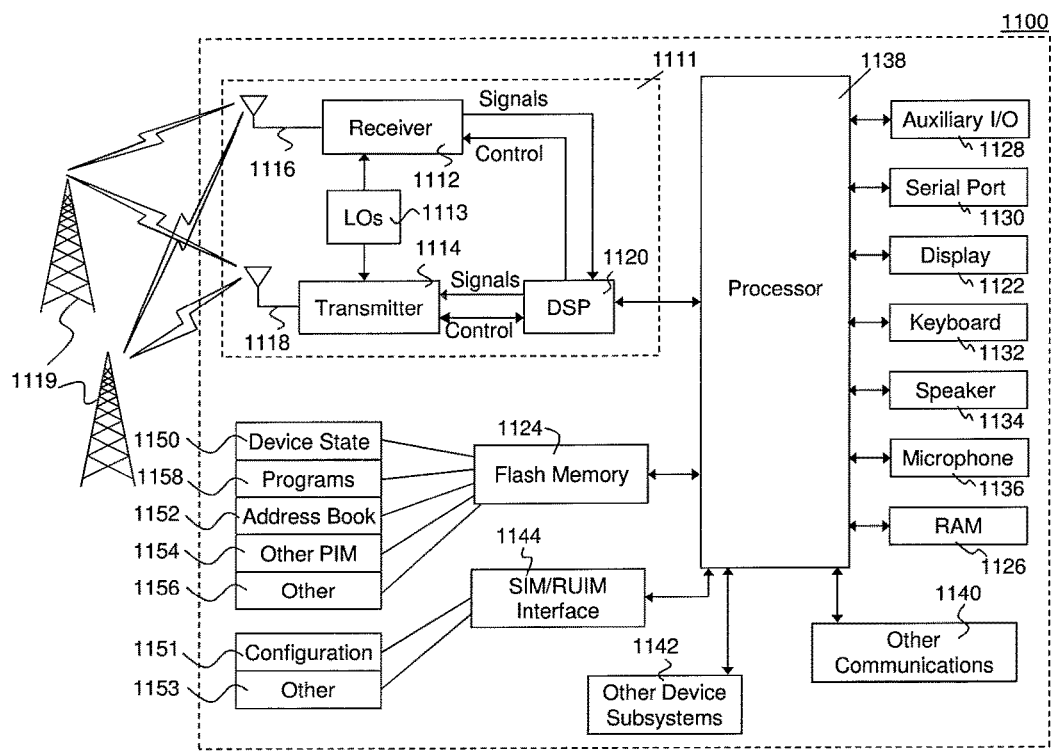
FIG. 11 is a block diagram of an example user equipment.

When required network registration or activation procedures have been completed, UE 1100 may send and receive communication signals over the network 1119. As illustrated in FIG. 11, network 1119 can consist of multiple base stations communicating with the UE.

Signals received by antenna 1116 through communication network 1119 are input to receiver 1112, which may perform such common receiver functions as signal amplification, frequency down conversion, filtering, channel selection and the like. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

UE 1100 generally includes a processor 1138 which controls the overall operation of the device. Communication functions, including data and voice communications, are performed through communication subsystem 1111. Processor 1138 also interacts with further device subsystems such as the display 1122, flash memory 1124, random access memory (RAM) 1126, auxiliary input/output (I/O) subsystems 1128, serial port 1130, one or more keyboards or keypads 1132, speaker 1134, microphone 1136, other communication subsystem 1140 such as a short-range communications subsystem and any other device subsystems generally designated as 1142. Serial port 1130 could include a USB port or other port known to those in the art.

Some of the subsystems shown in FIG. 11 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the processor 1138 may be stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Processor 1138, in addition to its operating system functions, may enable execution of software applications on the UE. A predetermined set of applications that control basic operations, including at least data and voice communication applications for example, will normally be installed on UE 1100 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1119. Further applications may also be loaded onto the UE 1100 through the network 1119, an auxiliary I/O subsystem 1128, serial port 1130, short-range communications subsystem 1140 or any other suitable subsystem 1142, and installed by a user in the RAM 1126 or a non-volatile store (not shown) for execution by the processor 1138. Such flexibility in application installation increases the functionality of the device and may provide enhanced on-device functions, communication-related functions, or both. For example, secure communication applications may enable electronic commerce functions and other such financial transactions to be performed using the UE 1100.

In a data communication mode, a received signal such as a text message or web page download will be processed by the communication subsystem 1111 and input to the processor 1138, which may further process the received signal for output to the display 1122, or alternatively to an auxiliary I/O device 1128.

A user of UE 1100 may also compose data items such as email messages for example, using the keyboard 1132, which may be a complete alphanumeric keyboard or telephone-type keypad, among others, in conjunction with the display 1122 and possibly an auxiliary I/O device 1128. Such composed items may then be transmitted over a communication network through the communication subsystem 1111.

For voice communications, overall operation of UE 1100 is similar, except that received signals would typically be output to a speaker 1134 and signals for transmission would be generated by a microphone 1136. Alternative voice or audio I/O subsystems, such as a voice message recording subsystem, may also be implemented on UE 1100. Although voice or audio signal output is generally accomplished primarily through the speaker 1134, display 1122 may also be used to provide an indication of the identity of a calling party, the duration of a voice call, or other voice call related information for example.

Serial port 1130 in FIG. 11 would normally be implemented in a personal digital assistant (PDA)-type UE for which synchronization with a user's desktop computer (not shown) may be desirable, but is an optional device component. Such a port 1130 would enable a user to set preferences through an external device or software application and would extend the capabilities of UE 1100 by providing for information or software downloads to UE 1100 other than through a wireless communication network. The alternate download path may for example be used to load an encryption key onto the device through a direct and thus reliable and trusted connection to thereby enable secure device communication. As will be appreciated by those skilled in the art, serial port 1130 can further be used to connect the UE to a computer to act as a modem.

Other communications subsystems 1140, such as a short-range communications subsystem, is a further optional component which may provide for communication between UE 1100 and different systems or devices, which need not necessarily be similar devices. For example, the subsystem 1140 may include an infrared device and associated circuits and components or a Bluetooth™ communication module to provide for communication with similarly enabled systems and devices. Subsystem 1140 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

APPENDIX A

5.2.3.1 Channel coding for UCI HARQ-ACK and CSI

In case the transmission of HARQ-ACK feedback using PUCCH format 3 [0058] coincides with a sub-frame configured to the UE by higher layers for transmission of scheduling request, the scheduling request bit (1 = positive SR; 0 = negative SR) is appended at the end of the sequence of concatenated HARQ-ACK bits. Additionally, CSI can be transmitted simultaneously with HARQ-ACK.

For $N_{A/N}^{PUCCH\,format\,3} \leq 11$, the bit sequence $a_0, a_1, a_2, \ldots, a_{N_{A/N}^{PUCCH\,format\,3}-1}$ is obtained by setting $a_i = \tilde{o}_i^{ACK}$ and for $N_{CSI}^{PUCCH\,format\,3} \leq 11$, the bit sequence $c_0, c_1, c_2, \ldots, c_{N_{CSI}^{PUCCH\,format\,3}-1}$ is obtained by setting $c_i = \tilde{o}_i^{CSI}$.

For $11 < N_{A/N}^{PUCCH\,format\,3} \leq 21$, the bit sequence $a_0, a_1, a_2, \ldots, a_{N_{A/N}^{PUCCH\,format\,3}-1}$ is obtained by setting $a_{i/2} = \tilde{o}_i^{ACK}$ if i is even and $a_{[N_{A/N}^{PUCCH\,format\,3}/2]+(i-1)/2} = \tilde{o}_i^{ACK}$ if i is odd.

For $N_{A/N}^{PUCCH\,format\,3} \leq 11$ and $N_{CSI}^{PUCCH\,format\,3} \leq 11$, the sequence of bits $a_0, a_1, a_2, \ldots, a_{N_{A/N}^{PUCCH\,format\,3}-1}$ and $c_0, c_1, c_2, \ldots, c_{N_{CSI}^{PUCCH\,format\,3}-1}$ is encoded as follows $$\tilde{b}_i = \sum_{n=0}^{N_{A/N}^{PUCCH\,format\,3}-1} (a_n \cdot M_{i,n}) \bmod 2 \text{ and}$$

$$\bar{b}_i = \sum_{n=0}^{N_{CSI}^{PUCCH\,format\,3}-1} (a_n \cdot M_{i,n}) \bmod 2$$

where i = 0, 1, 2, ..., 31 and the basis sequences $M_{i,n}$ are defined in Table 5.2.2.6.4-1.

The output bit sequence $b_0, b_1, b_2, \ldots, b_{B-1}$ and the output bit sequence $b_0^C, b_1^C, b_2^C, \ldots, b_{B-1}^C$ are obtained by circular repetition of the sequence $\tilde{b}_0, \tilde{b}_1, \tilde{b}_2, \ldots, \tilde{b}_{31}$ and $\bar{b}_0, \bar{b}_1, \bar{b}_2, \ldots, \bar{b}_{31}$, respectively $b_i = \tilde{b}_{(i \bmod 32)}$ and $b_i^C = \bar{b}_{(i \bmod 32)}$ where i = 0, 1, 2, ..., B-1 and where $B = 4 \cdot N_{sc}^{RB}$.

For $11 < N_{A/N}^{PUCCH\,format\,3} \leq 21$, the sequences of bits $a_0, a_1, a_2, \ldots, a_{[N_{A/N}^{PUCCH\,format\,3}/2]-1}$ and $a_{[N_{A/N}^{PUCCH\,format\,3}/2]}, a_{[N_{A/N}^{PUCCH\,format\,3}/2]+1}, a_{[N_{A/N}^{PUCCH\,format\,3}/2]+2}, \ldots, a_{N_{A/N}^{PUCCH\,format\,3}-1}$ are encoded as follows $$\tilde{b}_i = \sum_{n=0}^{[N_{A/N}^{PUCCH\,format\,3}/2]-1} (a_n \cdot M_{i,n}) \bmod 2$$

APPENDIX A-continued

5.2.3.1 Channel coding for UCI HARQ-ACK and CSI and $$\tilde{\tilde{b}}_i = \sum_{n=0}^{[N_{A/N}^{PUCCH\,format\,3}/2]-1} (a_{[N_{A/N}^{PUCCH\,format\,3}/2]+n} \cdot M_{i,n}) \bmod 2$$

where i = 0, 1, 2, ..., 23 and the basis sequences $M_{i,n}$ are defined in Table 5.2.2.6.4-1.
The output bit sequence $b_0, b_1, b_2, \ldots, b_{B-1}$ where $B = 4 \cdot N_{sc}^{RB}$ is obtained by the alternate concatenation of the bit sequences $\tilde{b}_0, \tilde{b}_1, \tilde{b}_2, \ldots, \tilde{b}_{23}$ and $\tilde{\tilde{b}}_0, \tilde{\tilde{b}}_1, \tilde{\tilde{b}}_2, \ldots, \tilde{\tilde{b}}_{23}$ as follows Set i, j = 0
while $i < 4 \cdot N_{sc}^{RB}$
    $b_i = \tilde{b}_j$, $b_{i+1} = \tilde{b}_{j+1}$ $b_{i+2} = \tilde{\tilde{b}}_j$, $b_{i+3} = \tilde{\tilde{b}}_{j+1}$ i = i + 4
    j = j + 2
end while
When PUCCH format 3 is not used for transmission of HARQ-ACK feedback, the HARQ-ACK bits are processed for transmission according to section 10.1.

The invention claimed is:

1. A method of operating a user equipment (UE) in a wireless communications network, the method comprising:
   inputting directly to a first encoder a first set of information bits that comprise hybrid automatic repeat request (HARQ) acknowledgement bits;
   inputting directly to a second encoder a second set of information bits that comprise channel state indicator (CSI) bits, the channel state indicator bits providing information on a state of a communication channel of the communications network;
   separately and independently encoding and rate matching the directly input first set of information bits and the directly input second set of information bits, the rate matching of the first set of information bits produces a first number of bits, and the rate matching of the second set of information bits produces a second number of bits, wherein the first and the second number of bits total a constant selected as a function of a modulation scheme;
   combining the encoded and rate matched first set of information bits and the second sets of information bits for transmission in the subframe by interleaving each of the separately encoded and rate matched first and second sets of information bits to respective specific locations within an entirety of the subframe, thereby creating a bit stream;
   modulating the bit stream based on the modulation scheme; and
   transmitting the bit stream on a control channel;
   wherein the first number of bits is a parameter configured by higher layer signaling.

2. The method of claim 1, wherein the encoding comprises using a Reed-Muller encoder.

3. The method of claim 1, wherein the transmission is done on a physical uplink control channel (PUCCH).

4. The method of claim 1, wherein the mapping comprises interleaving the first set of information bits with the second set of information bits.

5. A user equipment comprising:
a processor; and
a communications subsystem,
wherein the processor and communications subsystem are configured to:
input directly to a first encoder a first set of information bits that comprise hybrid automatic repeat request (HARQ) acknowledgement bits;
input directly to a second encoder a second set of information bits that comprise channel state indicator (CSI) bits, the channel state indicator bits providing information on a state of a communication channel of the communications network;
separately and independently encode and rate match the directly input first set of information bits and the directly input second set of information bits, the rate matching of the first set of information bits producing a first number of bits, and the rate matching of the second set of information bits producing a second number of bits, wherein the first and the second number of bits total a constant selected as a function of a modulation scheme;
and combine the encoded and rate matched first set of information bits and the second sets of information bits for transmission in the subframe by interleaving each of the separately encoded and rate matched first and second sets of information bits to respective specific locations within an entirety of the subframe, thereby creating a bit stream;
modulate the bit stream based on the modulation scheme; and
transmit the bit stream on a control channel;
wherein the first number of bits is a parameter configured by higher layer signaling.

6. The user equipment of claim 5, wherein the processor and communications subsystem are configured to encode by using a Reed-Muller encoder.

7. The user equipment of claim 5, wherein the transmission is done on a physical uplink control channel (PUCCH).

8. The user equipment of claim 5, wherein the processor and communications subsystem are configured to map by interleaving the first set of information bits with the second set of information bits.

9. A method of operating a user equipment (UE) in a wireless communications network, the method comprising:
inputting directly to a first encoder a first set of information bits that comprise hybrid automatic repeat request (HARQ) acknowledgement bits;
inputting directly to a second encoder a second set of information bits that comprise channel state indicator (CSI) bits, the channel state indicator bits providing information on a state of a communication channel of the communications network;
separately and independently encoding and rate matching the directly input first set of information bits and the directly input second set of information bits, the rate matching of the first set of information bits producing a first number of bits;
combining the encoded and rate matched first set of information bits and the second sets of information bits for transmission in the subframe by mapping each of the separately encoded and rate matched first and second sets of information bits to respective specific locations within an entirety of the subframe, thereby creating a bit stream;
selecting a modulation scheme based on a number of bits in the first set of information bits;
modulating the bit stream using the selected modulation scheme; and
transmitting the modulated bit stream on a control channel,
wherein the first number of bits is a parameter configured by higher layer signaling.

10. The method of claim 9, wherein, if the number of component carriers configured is less than a threshold, the modulation uses a higher order modulation technique than a default modulation technique.

11. The method of claim 10, wherein the higher order modulation technique is 16-Quadrature Amplitude Modulation, and
if the number of component carriers configured is less than the threshold, the encoding uses no puncturing; and
if the number of component carriers configured is higher than the threshold, the modulation using Quadrature Phase Shift Keying and puncturing.

12. A user equipment comprising:
a processor; and
a communications subsystem,
wherein the processor and communications subsystem are configured to:
input directly to a first encoder a first set of information bits that comprise hybrid automatic repeat request (HARQ) acknowledgement bits;
input directly to a second encoder a second set of information bits that comprise channel state indicator (CSI) bits, the channel state indicator bits providing information on a state of a communication channel of the communications network;
separately and independently encode and rate match the directly input first set of information bits and the directly input second set of information bits, the rate matching of the first set of information bits producing a first number of bits;
combine the encoded and rate matched first set of information bits and the second sets of information bits for transmission in the subframe by mapping each of the separately encoded and rate matched first and second sets of information bits to respective specific locations within an entirety of the subframe, thereby creating a bit stream;
select a modulation scheme based on a number of bits in the first set of information bits;
modulate the bit stream using the selected modulation scheme; and
transmit the modulated bit stream on a control channel,
wherein the first number of bits is a parameter configured by higher layer signaling.

13. The user equipment of claim 12, wherein, if the number of component carriers configured is less than a threshold, the processor and communications subsystem are configured to modulate using a higher order modulation technique than a default modulation technique.

14. The user equipment of claim 13, wherein the higher order modulation technique is 16-Quadrature Amplitude Modulation, and if the number of component carriers configured is less than the threshold, the processor and communications subsystem are configured to encode using no puncturing; and if the number of component carriers configured is higher than the threshold, the processor and communications subsystem are configured to modulate using Quadrature Phase Shift Keying and puncturing.

15. The user equipment of claim 14, wherein the puncturing provides more non-punctured bits for the HARQ acknowledgement bits.

16. A method of operating a user equipment (UE) in a wireless communications network, the method comprising:
inputting directly to a first encoder a first set of information bits that comprise hybrid automatic repeat request (HARQ) acknowledgement bits;
inputting directly to a second encoder a second set of information bits that comprise channel state indicator (CSI) bits, the channel state indicator bits providing information on a state of a communication channel of the communications network;
separately and independently encoding the directly input first set of information bits and the directly input second set of information bits;
rate matching the encoded first set of information bits using a first puncturing pattern to produce a first number of bits;
rate matching the encoded second set of information bits using a second puncturing pattern;
combining the encoded and rate matched first set of information bits and the second sets of information bits for transmission in the subframe by mapping each of the separately encoded and rate matched first and second sets of information bits to respective specific locations within an entirety of the subframe, thereby creating a bit stream; and
modulating and transmitting the bit stream on a control channel;
wherein a number of punctured bits within the first puncturing pattern and a number of punctured bits within the second puncturing pattern, and a modulation scheme used in the modulating depend on a number of configured component carriers, and
wherein the first number of bits is a parameter configured by higher layer signaling.

17. The method of claim 16, wherein the encoding uses a Reed-Muller encoder.

18. The method of claim 16, wherein the first set of information bits comprise hybrid automatic repeat request (HARQ) acknowledgement bits and the second set of information bits comprise channel state indicator bits.

19. The method of claim 16, wherein the transmission is done on a physical uplink control channel.

20. The method of claim 16, wherein the second puncturing pattern has more punctured bits than the first puncturing pattern.

21. A user equipment comprising:
a processor; and
a communications subsystem,
wherein the processor and communications subsystem are configured to:
input directly to a first encoder a first set of information bits that comprise hybrid automatic repeat request (HARQ) acknowledgement bits;
input directly to a second encoder a second set of information bits that comprise channel state indicator (CSI) bits, the channel state indicator bits providing information on a state of a communication channel of the communications network;
separately and independently encode the directly input first set of information bits and the directly input second set of information bits;
rate match the encoded first set of information bits using a first puncturing pattern to produce a first number of bits;
rate match the encoded second set of information bits using a second puncturing pattern;
combine the encoded and rate matched first set of information bits and the second sets of information bits for transmission in the subframe by mapping each of the separately encoded and rate matched first and second sets of information bits to respective specific locations within an entirety of the subframe, thereby creating a bit stream; and
modulate and transmit the bit stream on a control channel;
wherein a number of punctured bits within the first puncturing pattern and a number of punctured bits within the second puncturing pattern, and a modulation scheme used in the modulating depend on a number of configured component carriers, and
wherein the first number of bits is a parameter configured by higher layer signaling.

22. The user equipment of claim 21, wherein the processor and communications subsystem are configured to encode using a Reed-Muller encoder.

23. The user equipment of claim 21, wherein the first set of information bits comprise hybrid automatic repeat request (HARQ) acknowledgement bits and the second set of information bits comprise channel state indicator bits.

24. The user equipment of claim 21, wherein the transmission is done on a physical uplink control channel.

25. The user equipment of claim 21, wherein the second puncturing pattern has more punctured bits than the first puncturing pattern.

* * * * *